June 23, 1970    J. E. LADYJENSKI    3,516,116
DEVICE AND A PROCESS FOR CONTINUOUSLY FORMING A
SHEET OF THERMOPLASTIC MATERIAL
Filed Feb. 24, 1967
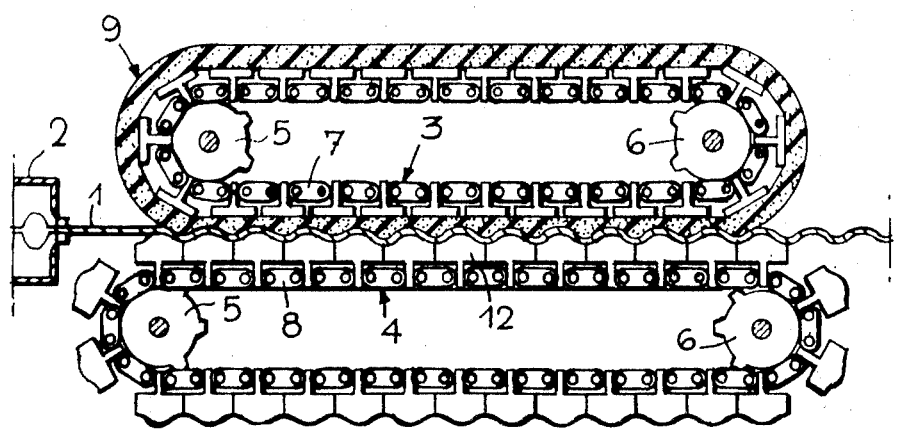
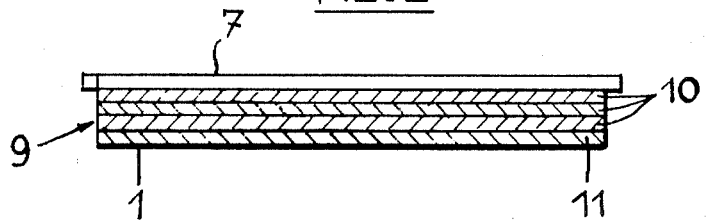

United States Patent Office 3,516,116
Patented June 23, 1970

3,516,116
DEVICE AND A PROCESS FOR CONTINUOUSLY FORMING A SHEET OF THERMOPLASTIC MATERIAL
Jacques E. Ladyjenski, 22 Rue Heyvaert,
Brussels, Belgium
Filed Feb. 24, 1967, Ser. No. 618,490
Claims priority, application Luxembourg, Mar. 31, 1966, 50,798
Int. Cl. B29c 17/02
U.S. Cl. 18—4                                       1 Claim

ABSTRACT OF THE DISCLOSURE

Device for continuously forming a sheet of thermoplastic material in which the sheet is fed, transported and compressed between rigid forming elements mounted on an endless chain and an endless ribbon mounted on another endless chain. Both chains move at equal speed and in different senses, with the rigid forming elements and the ribbon extending with said sheet between them over a sufficient length for the sheet, which cools during its transport along the said length, to remain formed at the end of the latter.

---

The present invention relates to a device for continuously forming a sheet of thermoplastic material.

In the usual devices and according to the conventional processes of this type, a plane sheet of thermoplastic material is fed by suitable feed means between first forming elements which, for example, are above and mounted on an upper endless chain, and second forming elements which, for example, are below and mounted on a lower endless chain, certain of the first elements, for example those of the lower strand of the upper chain, being parallel to certain of the second elements, for example those of the upper strand of the lower chain. The sheet is compressed between the said first and second forming elements to which is applied a relative pressure exerted by appropriate means.

Moreover, the sheet is transported by the said first and second elements by means in particular of rotating means for the said chains, at equal linear speeds. Moreover, the sheet which at the beginning of its passage between the said first and second elements is sufficiently heated throughout its mass to be able to be deformed and follow the contour of the said elements, cools progressively as it moves forward and at the end of its passage becomes sufficiently cold to retain its shape.

The usual devices have disadvantages particularly due to the fact that the first and second forming elements must correctly correspond to each other. It follows that it is necessary to be able to control the spacing and the lateral and longitudinal position of the first elements relative to the second elements, and to machine the said elements with precision. As a result, the known devices require costly plant and delicate control particularly when the dimensions of the sheet to be formed are great. Moreover, the production of the known devices is limited to simple surfaces or even to developable surfaces.

The object of the invention is a new device forming such a sheet of thermoplastic material, enabling the aforesaid disadvantages to be overcome.

For this purpose, in the new forming device, the first forming elements are constituted by an endless ribbon which for example is above and mounted on the upper chain, this ribbon being for at least part of its thickness of a deformable and elastic material preferably in the form of a foam and allowing the sheet to assume correctly the contour defined by the second forming elements for example below.

Moreover, in the new forming device the sheet is made to pass between rigid forming elements and an endless ribbon constituting the other formed elements and forming on at least part of this thickness a deformable and elastic material preferably in the form of a foam, while a suitable pressure is exerted on the ribbon whereby the sheet is continuously compressed. This new device enables a fixed and uniform pressure of the sheet to be obtained at all points and also enables the said sheet correctly to assume the contour defined by the rigid forming elements.

The new device therefore has in effect only a single set of forming elements, that is, the rigid elements which are generally the lower ones. As a result, when a change is made in the production of the formed sheets, it is enough simply to replace the said rigid elements without removing or changing the ribbon.

Finally the presence of a single set of forming elements enables an easy extension of the variety of contours which can be formed in the sheets produced and particularly to obtain slight countersunk effects.

According to an advantageous feature of the invention which makes possible the avoidance of rapid wear of the ribbon, the latter is stratified by being composed of at least one layer which is of a particularly deformable and elastic cellular elastomeric material, such as silicone or polychloroprene rubber, and an outer skin which is adapted to be in contact with the thermoplastic sheet and which is of an elastic and non-cellular elastomeric material, more compact and more resistant than that of the first layer.

The invention will now be described with reference to the accompanying drawings, which show embodiments of the invention but in no restrictive sense.

FIG. 1 is a frontal elevation of one embodiment of a forming device according to the invention.

FIG. 2 is a transverse section of a ribbon adapted to be fitted to such a device and different from the one shown in the preceding figure.

In these two figures, the same reference numerals designate identical elements.

The device shown is used to form a sheet 1 of thermoplastic material which comes out of an extrusion device 2. The surfaces to be formed in the sheet 1 may be complicated and in particular non-developable. The sheet 1 enters the device being thus heated throughout its mass.

The device arranged for example horizontally comprises essentially, on a support which is not shown, two superposed endless chains: an upper chain 3 and a lower chain 4. The chains 3 and 4 are mounted respectively on chain wheels 5 and 6, of which at least one is driving. The chains 3 and 4 turn simultaneously under the action of motor means at equal linear speeds but in opposite directions of rotation. The strands of the chains 3 and 4 are horizontal and co-extensive over a portion of their length. In a more general manner, the lower strand 7 of the upper chain 3 extends parallel to the upper strand 8 of the lower chain 4.

In accordance with the invention, the upper chain 3 is furnished with an endless ribbon 9. This ribbon is formed on at least part of its thickness of a deformable and elastic material. Thus in its first embodiment the ribbon is formed of a material in the form of a foam throughout its thickness while in its second embodiment, as shown in FIG. 2, the ribbon is stratified and is composed of three layers 10 of a particularly deformable and elastic cellular elastomeric material such as silicone or polychloroprene rubber and of an outer skin 11 of an elastic and non-cellular elastomeric material, more compact and more resistant than that of the layers 10, the skin 11 being adapted to come into contact with the sheet 1.

The lower chain 4 carries lower forming elements 12 forming a well-determined contour which may have slight countersunk effects. As can be seen in FIG. 1, the lower elements 12 are displaced parallel to the ribbon 9 and form with the latter a horizontally directed passage through which the sheet 1 is moved. Advantageously, the height of the said passage is adjustable.

The device also comprises means for compressing the sheet 1 between the chains 3 and 4. The said means known per se are not shown and allow the application of a suitable relative pressure between the ribbon 9 and the lower forming elements 12.

Generally, such pressure is applied to the ribbon 9 and is transmitted by the latter to the sheet 1.

The sheet 1 of thermoplastic material is therefore fed by suitable feeding means between the ribbon 9 and the forming elements 12. It is moved by the said ribbon 9 and the said elements 12 along the said passage formed by them. During its movement in the said passage, the sheet 1 is compressed continuously so as to be formed and assume the contour defined by the elements 12. On the other hand, the said sheet 1, which is sufficiently heated throughout its mass at the start of the said movement to be able to be easily formed under the downward pressure of the ribbon 9, cools progressively as it moves forward and becomes sufficiently cold to remain formed at the end of the said movement, the endless chains 3 and 4 being made sufficiently long for this purpose.

The procedure to form the extruded sheet by the device described above, is as follows: bring the sheet 1, heated throughout its mass, between the ribbon 9 and the lower forming elements 12, move the endless chains 3 and 4 at equal speeds and in different directions of rotation in such a way as to move the sheet 1 between the ribbon 9 and the elements 12, and compress the sheet 1 between the ribbon 9 and the elements 12 by exerting a suitable pressure preferably on the ribbon 9 so as to allow the sheet 1 to assume the contour defined by these elements 12.

It is obvious that the invention is not exclusively limited to the embodiments shown and that many modifications can be made in the shape, the arrangement and the constitution of certain of the elements taking part in its embodiment, on condition that the said modifications are not inconsistent with the object of the following claim.

What I claim is:

1. A device for continuously pressure forming a heated and softened sheet of thermoplastic material, comprising: rigid forming elements, a first endless chain supporting the rigid forming elements in a developed planar surface over a portion of the length thereof, an endless stratified ribbon composed of at least one layer which is of a particularly deformable and elastic cellular elastomeric material and of an outer skin which is adapted to be in contact with the thermoplastic sheet and which is of an elastic and non-cellular elastomeric material, more compact and more resistant than that of the first layer, a second endless chain supporting the ribbon over a portion of its length in parallel juxtaposed relation to the portion of the first chain, means for feeding the heated and softened thermoplastic sheet between the rigid forming elements and the ribbon at the parallel portions thereof, means for moving both chains at equal speed and in different directions of rotation allowing the transport of the sheet between the rigid forming elements and the ribbon, means for compressing the sheet between the rigid forming elements and the ribbon exerting a suitable pressure on said ribbon, the compressed ribbon forming the softened sheet onto the developed planar surface of the rigid forming elements, whereby the rigid forming elements and the ribbon extend, with the sheet between them, over a sufficient length for the sheet, which cools during its transport along said length, to harden and remain formed at the end of the juxtaposed positions of the chains.

References Cited

UNITED STATES PATENTS

| 3,066,351 | 12/1962 | Schriner | 18—4 |
| 3,099,518 | 7/1963 | Wetzler | 18—4 |
| 3,102,776 | 9/1963 | Steinmann et al. | 264—286 |
| 3,214,793 | 11/1965 | Vidal | 18—4 |
| 3,226,460 | 12/1965 | Dietzsch | 18—4 |
| 3,313,010 | 4/1967 | Betz | 18—4 |

ROBERT F. WHITE, Primary Examiner

J. R. THURLOW, Assistant Examiner

U.S. Cl. X.R.

18—19; 264—286